March 20, 1928.  
E. E. BERRY  
1,663,237  
CHAIN DRIVE FOR DRIERS  
Filed May 13, 1926  
3 Sheets-Sheet 3
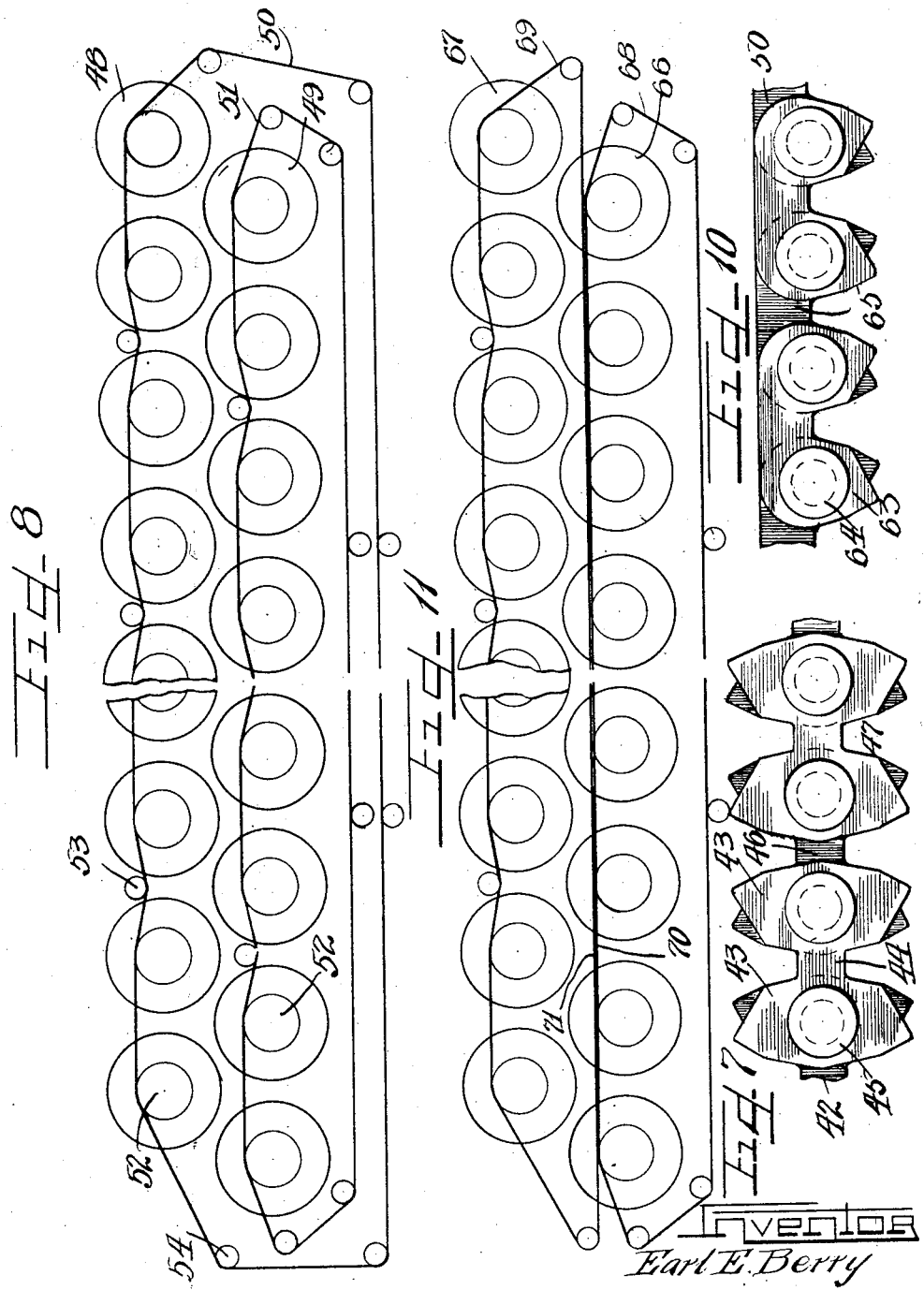
Inventor  
Earl E. Berry  
by Charles Hills  
Attys.

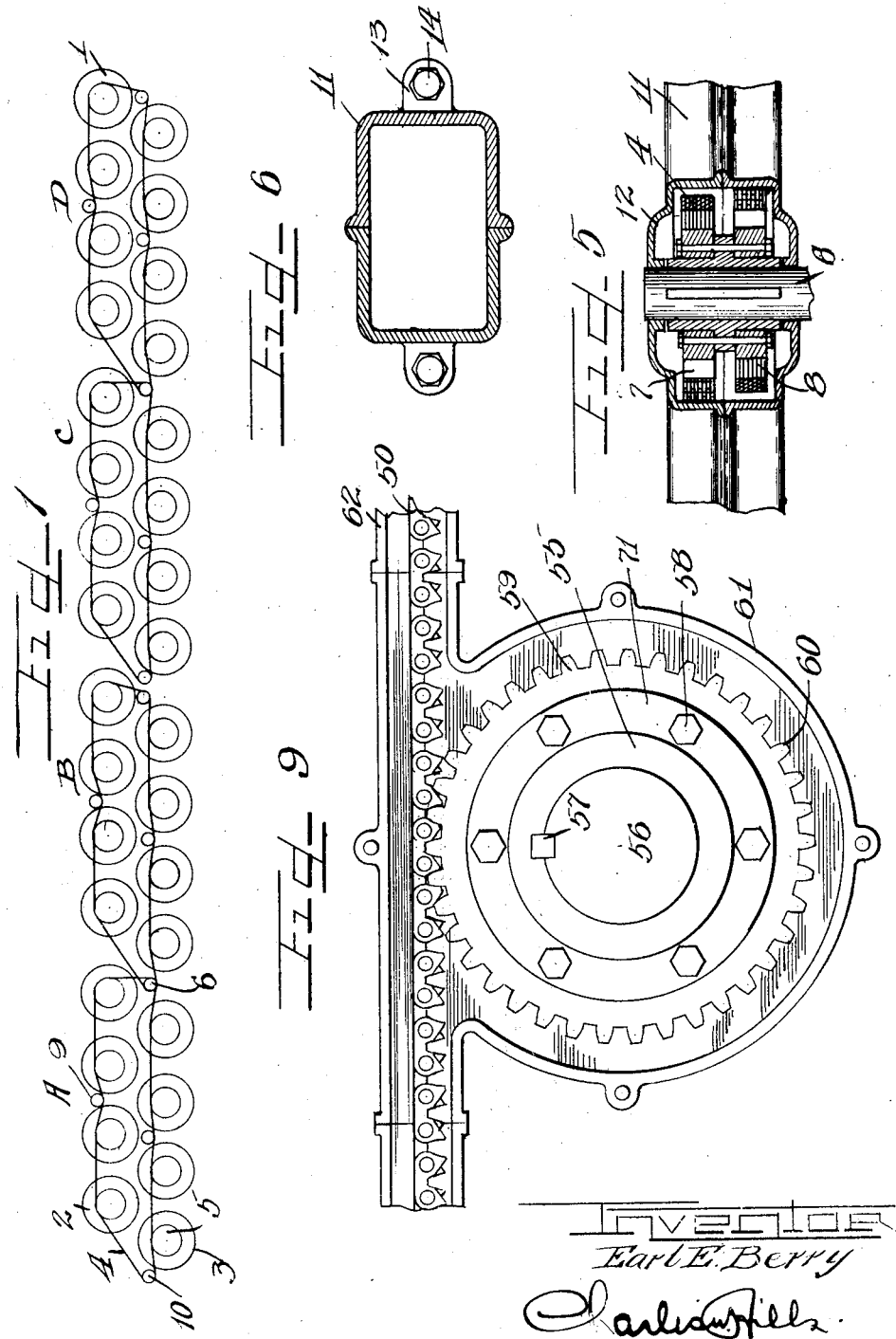

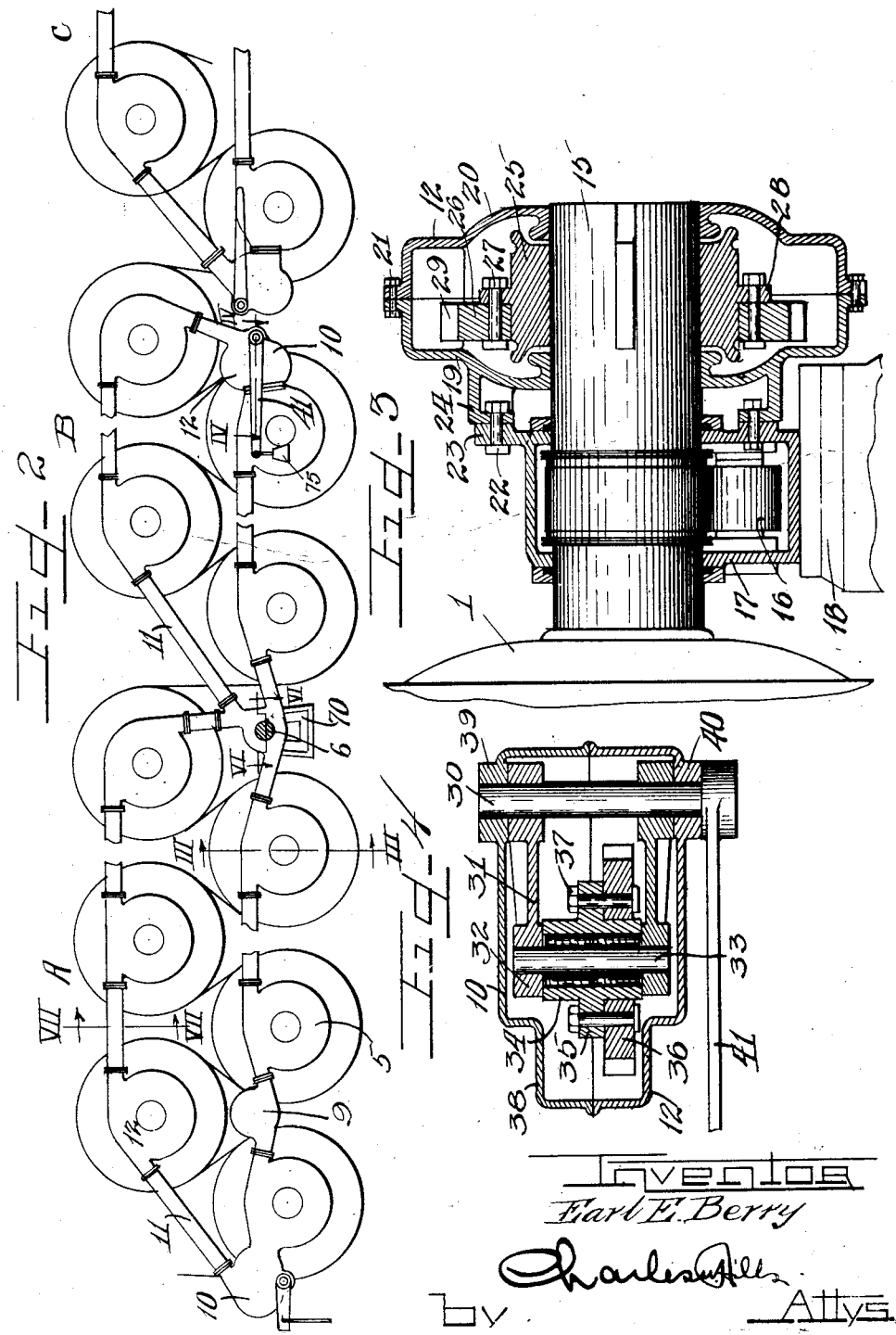

Patented Mar. 20, 1928.

1,663,237

UNITED STATES PATENT OFFICE.

EARL E. BERRY, OF BELOIT, WISCONSIN, ASSIGNOR TO BELOIT IRON WORKS, OF BELOIT, WISCONSIN, A CORPORATION OF WISCONSIN.

CHAIN DRIVE FOR DRIERS.

Application filed May 13, 1926. Serial No. 108,745.

This invention relates to a chain drive for driers and more particularly to an improved chain drive employing silent chains for driving the drying cylinders of a paper making machine drier unit.

My present invention constitutes an improvement over the invention set forth in my Patent No. 1,563,324 for "chain drive for drying cylinders", which issued December 1, 1925. In that patent the structure disclosed includes an ordinary link chain trained around sprockets secured on the hubs of the drying cylinders. The arrangement of the chain disclosed was such that the chain passed successively over sprockets on each of the upper and lower tiers of drier drums, thereby necessitating an unnecessarily long chain. Furthermore, the chain there shown was only partially guarded throughout its length.

It is therefore an object of this invention to provide a chain drive for drying cylinders wherein a silent chain is employed and the chain and driving gears are completely guarded.

It is further an object of this invention to provide an improved sectional chain drive for drying cylinders wherein the arrangement of the drive permits a shorter length of chain to be used and wherein improved tensioning devices are employed.

It is a further object of this invention to provide a chain for paper drying units wherein the drier cylinders are mounted in roller bearings and are driven by means of a silent chain trained around sprockets keyed to the journals of said drying cylinders, thus permitting the driers to be run at very high speeds without attendant noise, vibration or excessive wear and tear.

Other and further important objects of this invention will be apparent from the disclosures in the specification and the accompanying drawings.

This invention (in a preferred form) is illustrated in the drawings and hereinafter more fully described.

On the drawings:

Figure 1 is a diagrammatic elevational view of the rear side of a paper drying unit, showing the preferred arrangement of my chain drive.

Figure 2 is an enlarged broken elevational view of the same.

Figure 3 is an enlarged fragmentary sectional view taken on line III—III of Figure 2, with parts in elevation.

Figure 4 is an enlarged sectional view taken on line IV—IV of Figure 2, with parts in elevation.

Figure 5 is an enlarged sectional view taken on line V—V of Figure 2, with parts in elevation.

Figure 6 is an enlarged sectional view taken on line VI—VI of Figure 2, with parts omitted.

Figure 7 is an elevational view of a part of the silent chain used in my chain drive.

Figure 8 is a broken diagrammatic view of a modified arrangement of my chain drive.

Figure 9 is an enlarged elevational detail view, with parts removed, of a chain sprocket.

Figure 10 is a detail view of the form of chain used in my modified arrangement.

Figure 11 is a broken diagrammatic view of a second modified arrangement of my chain drive.

As shown on the drawings:

The usual construction of paper machine drying units comprises a series of drying cylinders 1 arranged in two tiers, commonly designated as the top driers 2 and bottom driers 3. As shown in Figure 1, my invention contemplates driving said drying cylinders 1 by means of chains 4 passing over sprocket mechanisms 5 preferably secured to the extended journals of the drying cylinders. In my preferred arrangement, I divide the driers into a plurality of sections or units, such as units A, B, C and D and employ a separate chain for driving each individual unit. The units A and B may be driven from a single drive shaft 6 supported in a bearing bracket 70 and having mounted thereon a pair of sprockets 7 and 8 (Figure 5). Instead of training the chains 4 over alternate bottom and top driers, I arrange each of said chains 4 so that the lower run thereof drives all of the bottom driers 3 in one section and the upper run thereof drives all of the top driers 2 in the same section, providing guiding sprockets 9 and stretch take-up sprockets 10 to keep the chains 4 under tension. By thus arranging the chain drive in sections, it is possible to use shorter lengths of chain and furthermore the chains being substantially horizontal, they can be run at higher rates of speed.

In Figures 2 to 7 inclusive my preferred form of chain drive is shown in greater detail. The chains 4 are adapted to be housed or guarded by means of sectional lengths of guards 11 connecting with guards 12 positioned around each of the sprockets 5. Said guards 11 are formed in complementary sections (Figure 6) of generally rectangular cross section and are provided at their ends with lugs 13 adapted to receive bolts 14 for securing together successive guards 11 and 12. The divided construction of the guards 11 permits either complementary section to be easily removed for repairing the chains.

Each of the drying cylinders 1 is provided with an elongated journal 15 at its rear end (Figure 3). Said journal 15 is adapted to be rotatably mounted on roller bearings 16 mounted in bearing housings 17, said bearing housings 17 being suitably supported upon pedestals 18. The sprocket guards 12 which are formed in two complementary flanged sections 19 and 20 bolted together at their adjacent flanged ends by means of bolts 21, are secured to said bearing housings 17 by means of bolts 22 passing through adjacent flanges 23 and 24 formed on said bearing housings 17 and said guard sections 19 respectively. A sprocket hub 25 is keyed to the end of each of the journals 15 and is enclosed within a sprocket guard 12. Sprocket rings 26 are adapted to be secured by means of bolts 27 to annular ribs 28 formed on said sprocket hubs 25. Said sprocket rings 26 are provided with teeth 29 over which the chains 4 are adapted to be chained.

The stretch take-up sprocket mechanisms 10 (Figure 4) each comprise a short stub shaft 30 on which are securely mounted a pair of spaced pivot arms 31. Each of said pivot arms 31 is provided at its end with a bearing 32 for receiving a sprocket shaft 33. A sprocket hub 34 is keyed to said shaft 33 between the pair of spaced pivot arms 31 and is provided with an annular rib 35 to which is bolted a sprocket ring 36 by means of bolts 37. The described sprocket mechanism is entirely enclosed within a guard or housing 38 formed in two complementary sections and provided with bearings 39 and 40 in which said stub shaft 30 is rotatably mounted. One end of said stub shaft 30 extends through the bearing 40 and is provided with a lever arm 41 keyed to said extension. Weights are adapted to be hung from the free end of said lever arm 41 to provide the necessary tensioning for the chains 4. It will be apparent that weights hung from the free end of the lever 41 will tend to swing the pivot arms 31 and the sprocket 36 mounted therefrom downwardly, thus applying tension on the chain passing around said sprocket 36.

Since in the arrangement of chain drive shown, the chains 4 must be provided with teeth on both sides, I have employed a double tooth chain 42 (Figure 7) of special construction. Said chain 42 comprises double pointed teeth 43 of laminated construction and formed in integral sets of two teeth each. In each set the two teeth 43 are connected by a restricted connecting portion 44. Pins 45 pass through each of said laminated teeth 43 and are connected by means of links 46 between successive sets of teeth 43. The faces of said teeth 43 are cut in the usual manner to form recesses 47 adapted to receive the teeth of the sprockets 5.

In the arrangement of chain drive described, the operation will be apparent from a study of the drawings. It should be noted, however, that since the driers are driven in separate sections, it is possible to vary the speed of revolution of the drying cylinders in separate sections to obtain different speeds at the wet and dry end. This is often important, as the web of paper in passing through the driers shrinks to a greater or less extent and unless some flexibility is provided in the driving of the driers, breaks are apt to occur from exerting too much tension on the paper.

In Figures 8 to 10 inclusive I have shown a modified form of chain drive in which the top driers 48 and the bottom driers 49 are each driven by separate chains 50 and 51 respectively, chain 51 lying within the loop formed by chain 50. The chains 50 and 51 are adapted to run over the top of sprocket mechanism 52 on the journals of the driers as before and are provided with the usual guide sprockets 53 and tensioning sprockets 54. Said sprockets 52 (Figure 9) each comprise a hub 55 keyed to the end of a journal 56, as by a key 57 and having an annular rib 71. To said rib 71 there is secured by means of bolts 58 a sprocket ring 59 having the usual sprocket teeth 60. The chains 50 and 51 which are trained over the sprocket teeth 60 on the sprocket ring 59 may in this instance be of the single tooth type (Figure 10). As previously described, both the sprocket mechanism and the chain are completely enclosed by sectional sprocket guards 61 and sectional chain guards 62. Said chains 50 and 51 each comprise double pointed teeth 63 formed in pairs and mounted on pins 64. Successive pairs of teeth 63 are joined by link members 65 passing over adjacent pins 64. The construction of the chains 50 and 51 is the usual type of silent chain construction and does not require a detailed description.

In Figure 11 there is shown a second modified arrangement of chain drive in which the bottom driers 66 and the top driers 67 are separately driven by chains 68 and 69 respectively, said chains 68 and 69, however, lying completely outside of each other, instead of one within the other, as in Figure 8. In this arrangement, the upper run 70 of the chain 68 forms a support for the lower run 71 of the chain 69. Said chains 68 and 69 are both of the single tooth silent chain construction previously described. It will be understood that the chains and sprockets are guarded in this arrangement in a similar way to the method employed in the other arrangements of chain drive.

While I have shown several adaptations of my invention, it will be evident that the particular arrangement of the chain drive may be varied to suit different requirements and conditions. The common features of all such arrangements of chain drive are, however, the construction employed for guarding the chains and the sprocket mechanisms, the construction employed in mounting the sprockets on the journals of the driving cylinders, the construction of the stretch take-up sprockets and the construction of the sprocket mechanism in general. The chief advantages of using my silent chain drive in driving drying cylinders are, of course, the absence of noise and vibration that result from its use, the flexibility imparted to the driving mechanism, and the ease with which the speed of the drying cylinders may be increased up to the highest known speed for driving such cylinders, without the attendant strain and danger now experienced on gear driven dry units.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a drier unit, a plurality of drying cylinders, and a chain mechanism for driving sections of said drying cylinders independent of other sections.

2. In a drier unit, a plurality of horizontally alined drying cylinders having sprocket mechanisms mounted thereon arranged in tiers, and substantially horizontal chain mechanisms for driving said cylinders in sections, a strand of each of the chains being trained over successive sprockets in the same tier.

3. In a drier unit, a plurality of drying cylinders, chain and sprocket mechanisms for driving said cylinders, and sectional guards for said chain and sprocket mechanisms.

4. In a drier unit, a plurality of drier cylinders having extended journals, sprocket gears secured to said extended journals, a chain trained over said gears and sectional guards for each of said gears having tangential tubular extensions for said chain.

5. In a drier unit, a plurality of drier cylinders arranged in tiers, sprocket gears associated with said cylinders and chains trained over said sprocket gears, a single strand of said chains driving consecutive cylinders in the same tier.

In testimony whereof I have hereunto subscribed my name.

EARL E. BERRY.